June 10, 1924.　　　　　　　　　　　　　　　　　　1,497,158
P. G. PIPER
CURRENT MOTOR
Filed April 9, 1923　　　　　2 Sheets-Sheet 2

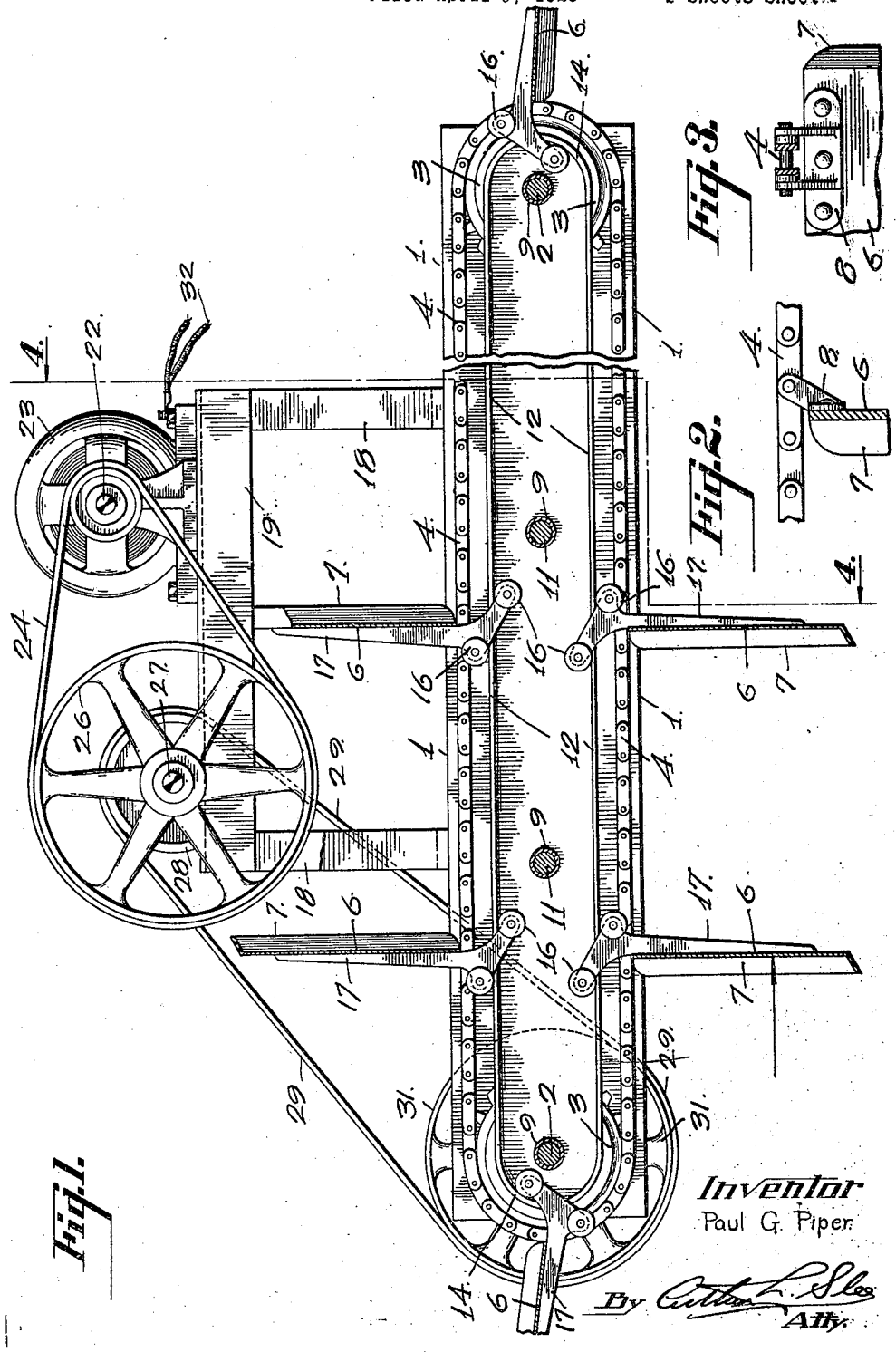

Inventor
Paul G. Piper.

By Arthur L. Slee
Atty.

Patented June 10, 1924.

1,497,158

UNITED STATES PATENT OFFICE.

PAUL G. PIPER, OF SAN FRANCISCO, CALIFORNIA.

CURRENT MOTOR.

Application filed April 9, 1923. Serial No. 631,019.

*To all whom it may concern:*

Be it known that, PAUL G. PIPER, a citizen of the United States, residing in the city and county of San Francisco and State of California, has invented a new and useful Improvement in a Current Motor, of which the following is a specification.

My invention relates to improvement in current motors wherein a plurality of flights are pivotally mounted upon a pair of endless chains and operate in conjunction with a pair of tracks arranged in parallel relation to said chains to maintain the flights opposed to a current and to relieve said chains of lateral strains.

The primary object of the present invention is to provide a new and improved current motor;

A further object is to provide a new and improved device of the character described wherein a pair of tracks arranged in parallel relation to a pair of endless chains operate to slidably retain a plurality of flights opposed to a current in such a manner that lateral strains upon the chains are prevented.

The invention consists in the details of construction disclosed in the drawings and set forth in the appended specifications and claims and wherein like characters of reference are used to designate similar parts throughout the said specification and drawings, and in which;

Fig. 1 is a broken side elevation, partly in longitudinal section, disclosing my improvement;

Fig. 2 is an enlarged broken side view, partly in section, disclosing the manner in which the flights are pivotally connected to the chains;

Fig. 3 is a side elevation of Fig. 2; and

Figure 4:
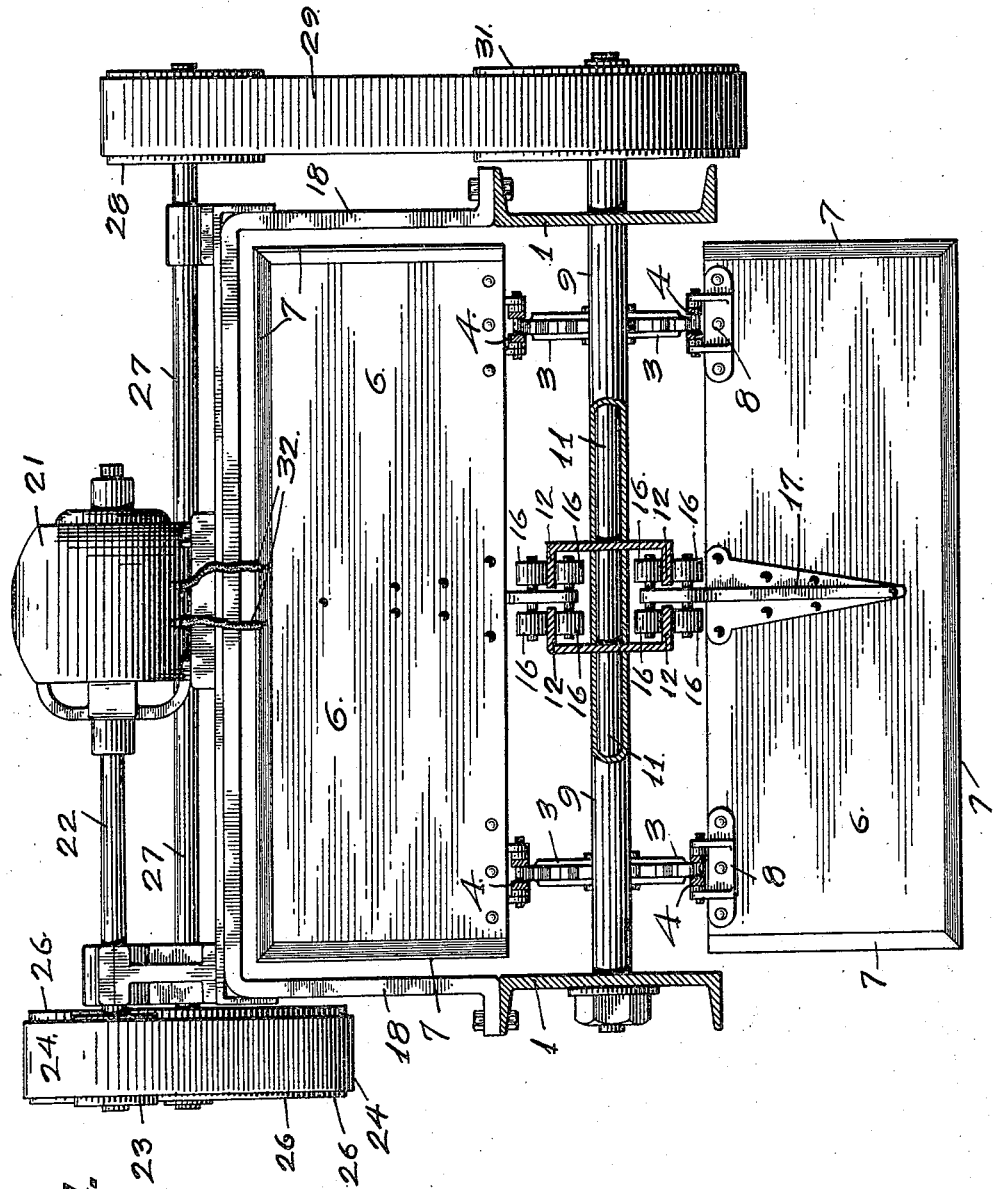
Fig. 4 is a transverse sectional view taken on line 4—4 of Fig. 1 in the direction indicated.

I am aware that prior to my invention current motors have been used wherein a pair of endless chains or a belt is provided with a plurality of flights held in opposed relation to the current or stream within which the apparatus floats or is otherwise supported so that the said current will affect a pressure upon said flights to move said endless chains or belts.

In this type of current motor where a flexible belt or chains must of necessity be employed the pressure of the current has a tendency to buckle the chains or belt by lateral pressure with the result that the said chains or belt are not only tightened to such an extent that the resulting friction absorbs a considerable quantity of the power developed, but are sometimes owing to said lateral pressure, raised to such an extent that a considerable portion of the effective area of the flights is removed from the water thereby reducing the pressure area of the device and reducing its efficiency.

In order to overcome or remove this lateral pressure from the conveyor, be it in the form of belt or chains, I have provided the improved device which may be described as follows:

Referring to the drawings the numeral 1 is used to designate a suitable frame which as in the present instance may be composed of a pair of parallel outwardly facing horizontally disposed channel members.

Rotatably mounted within each end of the frame 1 is a transverse shaft 2 provided with a pair of sprockets 3 upon which are mounted a pair of parallel endless chains 4 having pivotally connected thereto a plurality of flights 6 having their outer and end edges flanged as at 7 to impart rigidity to said flights and also to increase the working or effective pressure area.

The flights 6 are pivotally connected to the chains 4 by means of suitable brackets 8 the purpose of which pivotal connection will hereinafter be more fully described.

The channel members of the frame 1 are normally held in proper spaced relation to each other by means of suitable thimbles or separators 9 mounted upon the transverse shafts 2 and intermediate rods or supports 11 as disclosed in Figs. 1 and 4 of the drawings.

The thimbles 9 and rods 11 are also utilized to retain in spaced relation to each other and in parallel relation to the parallel endless chains 4 a pair of inwardly facing channels or tracks 12 having rounded end portions 14 arranged to connect with the upper and lower flanges of said channels or tracks 12 and thereby provide a pair of continuous tracks which are engaged on both sides by sets of upper and lower rollers 16 mounted upon a suitable standard or stem 17 rigidly connected to the back of each flight 6.

The frame members or channels 1 are further supported and retained in proper spaced relation by means of a pair of inverted U-shaped members 18 mounted upon the upper side of said frame 1 and in turn supporting a suitable platform 19.

A suitable generator 21 is mounted upon this platform and is provided with a shaft 22 which is provided with a pulley 23 driven by means of a belt 24 connecting said pulley with a sheave 26 upon a counter shaft 27 rotatably mounted upon said platform 19 and provided at its opposite end with a sheave 28 connected by means of a suitable drive 29 to a sheave 31 mounted upon one of the transverse shafts 2 whereby movement of the flights 6 and chains 4 will, through the medium of the sprockets 3 and shaft 2, actuate the belts or drives 24 and 29 and the sheaves and pulleys 31, 28, 26 and 23 and thereby operate the generator, which, as in the present instance, may be an electrical generator, thereby developing energy which may be transmitted to remote points by means of suitable conductors 32.

In operation, the entire device is suspended or floated in a horizontally disposed position in a current or moving stream with the lower flights submerged and the upper flights above the surface of said stream.

Assuming the direction of the current to be as indicated by the arrow directed against one of the lower flights 6 in the lower portion of Fig. 1 of the drawings, it is obvious that the pressure occasioned by said stream will be directed against the lower flights as indicated.

Normally the resistance due to inertia, friction and the load or work being performed, would cause the upper ends of the lower flights 6 to resist movement by said current while the lower or outer edges of said flights 6, owing to leverage, will have a tendency to move in an arc of which the connection point of said flights with the chains will be the center or pivot.

This tendency will buckle the chains 4 and thereby tighten said chains upon the sprockets 3 to such an extent that considerable friction will be created which will absorb a considerable portion of the energy developed or transmitted by the current.

A further disadvantage of such an arrangement will be that the flights are not held perpendicularly or directly opposed to the direction of the current but will be inclined or slanted and the resulting pressure upon such inclined flights will tend to not only raise them from the stream but will also reduce the amount of current pressure upon said flights and thereby reduce their efficiency as well as the energy imparted to said flights by said current.

In order to maintain the flights 6 fully submerged and at right angles to the direction of the current I have provided the upper and lower rollers 16 in pairs which rollers ride one pair on top and the other pair below the lower track 12.

The result of this arrangement is that one pair of rollers 16 will operate as a fulcrum to the lever formed by the flight 6 and the standard 17 and the other pair of rollers will operate as a stop to effectively but easily and movably retain said flights at right angles to the chains 4 and to the direction of the current thereby relieving the said chains 4 of any lateral strains as hereinbefore set forth with a resulting increase in efficiency and also in an increase in the amount of energy developed.

As these rollers 16 are easily movable on their respective tracks 12 it is obvious that the flights may be easily moved by the current and thereby impart motion to the device which motion will in turn actuate or operate the generator.

The flights 6 are pivoted to the chains 4 for the further purpose of permitting a movement of said flights relatively to the chains 4 while said flights are traversing the rounded connecting portions 14 on the end of said tracks 12, during which time said flights are moved slightly owing to the difference in relative position of said tracks to the adjacent portion of the chains.

On the return portion of the travel of the flights over the upper portions of the parallel tracks 12 one set of rollers will serve to relieve the weight of the flights from the chains 4 and thereby further reduce the friction which would otherwise be caused by a sagging of said chain.

It is obvious from the foregoing that I have provided a new and improved construction of current motors wherein the flights are held directly opposed or at right angles to the direction of the current and the chains relieved of any lateral movement caused by the pressure of said current on said flights.

Having thus described my invention what I claim as new and desire to secure by Letters Patent is—

1. A current motor comprising a suitable frame; a pair of endless chains rotatably mounted upon the frame; a plurality of flights pivotally connected to said chains; a pair of channels mounted in slightly spaced relation between the chains and parallel thereto, the flanges of said channels forming tracks; brackets secured upon the flights and adapted to extend between the channels; and rollers mounted upon the brackets to engage opposite sides of the flanges to slidably retain the flights in normal relation to an impelling current and to relieve the chains from lateral pressure from the flights.

2. A current motor comprising a suitable frame; a pair of endless chains rotatably mounted upon the frame; a plurality of flights pivotally connected to the chains; a pair of channels mounted upon the frame between the chains and in parallel relation thereto, said channels having their flanges disposed toward each other and arranged in slightly spaced relation, the flanges of each channel being connected by rounded portions at each end to form continuous tracks; brackets mounted upon the flights and extending between the channel flanges; and rollers mounted upon the brackets and engaging opposite sides of each flange to slidably retain the flights in normal relation to a current and to relieve the chains from lateral pressure from the flights.

3. A current motor comprising a suitable frame; a pair of endless chains rotatably mounted upon the frame; a plurality of flights pivotally connected to the chains; a pair of channels mounted upon the frame between the chains and in parallel relation thereto, said channels having their flanges disposed toward each other and arranged in slightly spaced relation, the flanges of each channel being connected by rounded flange portions at each end to form continuous tracks; brackets mounted upon the flight and extending between the flanges; and rollers mounted in pairs in angularly spaced relation upon the sides of the brackets to engage opposite sides of the flanges of each channel to slidably retain the flights in normal relation to a current and to relieve the chains of lateral pressure from the flights.

In witness whereof I hereunto set my signature.

PAUL G. PIPER.